United States Patent
Kumar et al.

(10) Patent No.: US 11,941,387 B2
(45) Date of Patent: Mar. 26, 2024

(54) SYSTEM FOR PROVIDING A MOBILE DEVICE WITH REMOTE OR PROXY ACCESS TO MERCHANT APPS AND/OR AUTOMATIC REGISTRATION ON MERCHANT APPS BASED ON LOCATION PARAMETERS

(71) Applicant: APP-POP-UP INC., Winnipeg (CA)

(72) Inventors: Rajeev Kumar, Disraeli (CA); Rakesh Kumar, Disraeli (CA)

(73) Assignee: APP-POP-UP INC., Steinbach (CA)

( * ) Notice: Subject to any disclaimer, the term of this patent is extended or adjusted under 35 U.S.C. 154(b) by 245 days.

(21) Appl. No.: 17/459,702

(22) Filed: Aug. 27, 2021

(65) Prior Publication Data

US 2022/0066763 A1    Mar. 3, 2022

Related U.S. Application Data

(60) Provisional application No. 63/071,003, filed on Aug. 27, 2020.

(51) Int. Cl.
| | |
|---|---|
| *G06F 9/445* | (2018.01) |
| *G01C 21/36* | (2006.01) |
| *G06F 8/61* | (2018.01) |
| *G06F 16/9537* | (2019.01) |
| *G06Q 30/02* | (2023.01) |
| *H04W 4/021* | (2018.01) |
| *H04W 4/50* | (2018.01) |

(52) U.S. Cl.
CPC ........... *G06F 8/61* (2013.01); *G01C 21/3667* (2013.01); *G06F 16/9537* (2019.01); *G06Q 30/0281* (2013.01); *H04W 4/021* (2013.01); *H04W 4/50* (2018.02)

(58) Field of Classification Search
CPC .......................................................... G06F 8/61
USPC ........................................................ 717/178
See application file for complete search history.

(56) References Cited

U.S. PATENT DOCUMENTS

| | | | | |
|---|---|---|---|---|
| 8,275,353 | B2 * | 9/2012 | Sun | G06Q 20/085 |
| | | | | 455/406 |
| 11,354,651 | B2 * | 6/2022 | Ortiz | G06Q 20/023 |
| 2018/0253727 | A1 * | 9/2018 | Ortiz | G06Q 20/023 |

* cited by examiner

*Primary Examiner* — Evral E Bodden
(74) *Attorney, Agent, or Firm* — PRAXIS

(57) ABSTRACT

A computer implemented system provides clients with communicating and/or transacting with merchants by way of mobile applications. The system creates a virtual machine associated with a client and the client can download mobile applications provided by merchants on this virtual machine. The system creates ghost icons and ghost image input commands associated with the mobile applications and displayed via the mobile device. The client can enter inputs via the ghost image input commands and receive outputs via the mobile device without downloading the mobile applications onto their mobile device memory. The system displays a ghost icon of a mobile application via the mobile device when the mobile device is within a predetermined proximity level of a commercial location associated with a merchant controller system comprising this mobile application. When the mobile device is outside this predetermined proximity level, the system does not display the ghost icon.

14 Claims, 4 Drawing Sheets

SYSTEM FOR PROVIDING A MOBILE DEVICE WITH REMOTE OR PROXY ACCESS TO MERCHANT APPS AND/OR AUTOMATIC REGISTRATION ON MERCHANT APPS BASED ON LOCATION PARAMETERS

CROSS-REFERENCE TO RELATED APPLICATIONS

The present application claims priority on U.S. Provisional Patent Application Ser. No. 63/071,003 filed on Aug. 27, 2020 and incorporated herein in its entirety.

TECHNICAL FIELD

The present disclosure generally relates to a mobile device interface for accessing applications. More specifically, but not exclusively, the present application relates to a system for a location modulated client interface for mobile devices allowing remote access to merchant hosted mobile applications. More specifically, but not exclusively, the present application relates to a system for automatically registering client profiles on a mobile application. More particularly, but still not exclusively, the system monitors user transactions with merchants and assists in navigating users to merchant locations.

BACKGROUND

It is well known in the art for merchants such as restaurants, gas stations, retailers, hotels, camp sites, shopping malls, banks and the like to provide mobile device application software (i.e. mobile apps) to be downloaded onto the client's mobile device so that the client can communicate and or transact via the mobile app which comprises an input/output interface therefor. These mobile apps are convenient as they allow client access to various services, products and information enhancing and even optimizing the shopping experience. When accumulated, these mobile apps may take a lot of space in the mobile memory of the mobile device, forcing users (clients) to purchase device with more memory space or delete certain apps in favor of other ones.

These mobile apps usually require the user (client) to register their profile thereon in order to be accessed.

As users transact with many merchants via apps using several cards, they receive many receipts from different sources, and different statements form different financial institutions which is burdensome to monitor and organize.

Clients are usually interested in accessing apps when they are near the physical location of a merchant outlet.

OBJECTS

An object of the present disclosure is to provide a computer implemented system for a providing participating clients to communicate and/or transact with multiple participating merchants by way of mobile applications via a mobile device.

An object of the present disclosure is to provide a computer-implemented system for modulating a navigation graphical user interface during movement of a vehicle.

An object of the present disclosure is to provide a computer implemented system for monitoring, recording, and reporting transactions of system users with merchants.

SUMMARY

In accordance with an aspect of the present disclosure, there is provided a computer implemented system for a providing participating clients to communicate and/or transact with multiple participating merchants by way of mobile applications via a mobile device, the system comprising: at least one client input/output interface integrated within at least one mobile device; and a system controller having an associated memory with processor executable code stored thereon, the system controller configured for operative communication with the mobile device via a network, the system controller being configured for operative communication with at least one merchant system controller of at least one participating merchant via a network, the merchant system controller hosting a mobile application for being downloaded within a mobile device providing for clients to communicate and or transact with the at least one participating merchant; wherein execution of the processor executable code causes the system controller to perform real time computer implementable steps of: determining a geographic location of the at least one mobile device via a location application in the memory of the mobile device and accessible thereto via the input/output interface; determining whether the at least one mobile device is within a predetermined proximity level of a commercial location associated with the at least one merchant system, wherein the commercial location is stored within the memory of the system controller or accessible thereto via the at least one merchant system controller; accessing the mobile application hosted by the at least one merchant controller system when the at least one mobile device is within the predetermined proximity level; displaying the mobile application via the input/output interface; providing for the user to enter inputs and receive outputs via the mobile application without downloading the mobile application within the mobile device memory.

In an embodiment, execution of the processor executable code causes the system controller to perform real time computer implementable step of: downloading the mobile application within the system controller memory and executing the application.

In an embodiment, the system further comprises a position locator module for capturing information related to a target within the predetermined proximity level, wherein the target is selected from the group comprising the mobile device and a combination of the mobile device and the user associated therewith, wherein the predetermined proximity level comprises a predetermined physical area.

In an embodiment, the position locator module comprises one or more devices selected from the group consisting of image capturing devices, sensors, GPS devices and combinations thereof.

In an embodiment, the merchant controller system is in operative communication with the position locator module for receiving the captured information of the target within the predetermined physical area, the merchant controller communicating the received captured information of the target to the system controller.

In an embodiment, the system controller is in operative communication with the position locator module for receiving the captured information of the target within the predetermined physical area.

In an embodiment, the system further comprises a user profile stored in the memory thereof related to the user and performs the computer-implementable step of determining whether the captured information matches the user profile thereby determining the presence of the user in the predetermined physical area and communicating the determined presence to the merchant controller system.

In an embodiment, the system controller executes the computer-implemented step of transmitting a message to the user via the input/output interface prior to displaying the mobile application, the message requesting from the user to input a command accepting that the mobile application be displayed. In an embodiment, the message is selected from the group consisting of a textual message, a graphical message, an audio message, a vibratory message and any combination thereof. In an embodiment, the system controller comprises a user profile stored in the memory thereof comprising user identification information, the system controller performing the computer executable step of receiving information from the user via input commands in order to store the user identification in the memory thereof, the system uploading the user identification information to the mobile application when the user inputs the command accepting that the mobile application be displayed.

In an embodiment, the commercial location is selected from the group consisting of a physical location and a virtual location.

In accordance with an aspect of the present disclosure, there is provided computer implemented system for providing participating clients to communicate and/or transact with multiple participating merchants by way of mobile applications via a mobile device, the system comprising: at least one client input/output interface integrated within at least one mobile device; and a system controller having an associated memory with processor executable code stored thereon, the system controller comprising a databank of user profile information stored thereon, the system controller configured for operative communication with the mobile device via a network, the system controller being configured for operative communication with at least one merchant system controller of at least one participating merchant via a network, the merchant system controller hosting a mobile application for being downloaded within a mobile device providing for clients to communicate and or transact with the at least one participating merchant, the mobile application comprising a profile registration section requiring inputs from users prior to being downloaded; wherein execution of the processor executable code causes the system controller to perform real time computer implementable steps of: accessing the mobile application hosted by the at least one merchant controller system; automatically enter profile information in the profile registration section of the mobile application related to a given user providing for the given user to access the mobile application.

In an embodiment, user access is provided by the downloading of the mobile application into the memory of the mobile device.

In an embodiment, user access is provided by execution of the processor executable code causing the system controller to perform real time computer implementable steps of: displaying the mobile application via the input/output interface; and providing for the user to enter inputs and receive outputs via the mobile application without downloading the mobile application within the mobile device memory.

In an embodiment, execution of the processor executable code causes the system controller to perform real time computer implementable steps of: (i) determining a geographic location of the at least one mobile device via a location application in the memory of the mobile device and accessible thereto via the input/output interface; (ii) determining whether the at least one mobile device is within a predetermined proximity level of a commercial location associated with the at least one merchant system, wherein the commercial location is stored within the memory of the system controller or accessible thereto via the at least one merchant system controller; wherein accessing of the mobile application and automatic registration is performed based on steps (i) and (ii) being performed.

In an embodiment, the system further comprises a position locator module is operative communication with the system controller for providing profile data thereto, wherein execution of the processor executable code causes the system controller to perform real time computer implementable steps of: (a) comparing the profile data received form the position locator module to the user profile information stored in the databank; and (b) determining a match between received profile data and stored user profile information, wherein accessing of the mobile application and automatic registration is performed based on steps (a) and (b) being performed.

In accordance with an aspect of the present disclosure, there is provided a computer-implemented system for modulating a navigation graphical user interface during movement of a vehicle, the system comprising: at least one client input/output interface integrated within at least one mobile device being positioned within the moving vehicle and comprising a device controller with an associated memory of processor executable code stored thereon, the memory comprising a positioning system application providing for real-time tracking of a position of the moving vehicle within a geographic location, and determining a direction pathway towards a target location within the geographic location, client input/output interface comprising a display for displaying the navigation graphical user interface; and a system controller having an associated memory with processor executable code stored thereon, the system controller configured for operative communication with the mobile device via a network; wherein execution of the processor executable code causes the system controller to perform real time computer implementable steps of: determining the geographic location of the at least one mobile device and moving vehicle via the positioning system application in the memory of the mobile device and accessible thereto via the input/output interface; generating a leader virtual vehicle image within the navigation graphical user interface displayed via the device display, wherein the virtual vehicle image is positioned ahead of the tracked position of the moving vehicle within the navigation pathway.

In an embodiment, the navigation graphical user interface comprises an image of the geographical location, a virtual image of the moving vehicle, wherein the virtual moving vehicle image is shown moving along the direction pathway within the geographical location image thereby indicating a real time position of the moving vehicle, the leader virtual vehicle image being shown to move ahead of the virtual moving vehicle image within the geographical location image along the direction pathway.

In an embodiment, the geographical location image is selected from the group consisting of: a virtual map, a satellite map, a three-dimension virtual map.

In an embodiment, the moving vehicle moves within an ambient environment along a real path corresponding to the direction pathway, the system further comprising a camera in operative communication with the at least one mobile device and mounted to the vehicle for video acquisition of the ambient environment in the direction of the real path and for real time feeding of the acquired video to the device for real time display of the video feed via the display, wherein the leader virtual vehicle image is positioned within the displayed video feed in the real path ahead of the moving vehicle along the pathway.

In an embodiment, the system performs real time computer implementable steps of: analyzing a portion of the video feed corresponding to a position further downstream the direction pathway; comparing the analyzed portion with event images stored within the system memory indicative of respective events; determining a similarity between an analyzed portion of the and the event images above a predetermined similarity threshold thereby identifying one or more matches between the analyzed portion and the event images indicative of one or more of the respective events; and communicating the one or more of the respective events via the navigation graphical user interface.

In an embodiment, the step of communicating the one or more of the respective events comprises visually modulating the leader virtual vehicle image.

In accordance with an aspect of the present disclosure, there is provided a computer implemented system for monitoring, recording, and reporting transactions of system users with merchants, the system comprising: a client device associated with a user comprising an input/output interface including a display and providing for network communication with one or merchant controller systems associated with one or more merchants, the display of the client device providing for viewing merchant web pages generated by the one or more merchant controller systems and for selecting items thereon and selectively make payments therefor via input commands through the input/output interface; and a system controller having an associated memory with processor executable code stored thereon, the system controller comprising a databank of user profile information stored thereon related the user, the system controller configured for operative communication with the client device via a network, wherein execution of the processor executable code causes the system controller to perform real time computer implementable steps of: monitoring user activity of the client device on the merchant web pages the user activity comprises web page viewing activity, item selection activity and payment activity; registering the user activity in the user profile; and generating a user activity report.

In an embodiment, the system controller performs real time computer implementable steps of: tracking an address associated with the client device; registering the address associated with the client device in the user profile; and transmitting the user activity report to the address associated with the client device.

In an embodiment, the address associated with the client device is selected from the group consisting of an IP address, a MAC address, an IMEI address and any combination thereof.

In an embodiment, the user profile comprises user payment method information uploaded by the user by way of input commands via the input/output interface.

In an embodiment, the system controller is network communication with one or more of the merchant system controllers wherein the system controller performs real time computer implementable step of: tracking an address associated with the one or more merchant system controllers.

In an embodiment, when a user makes a payment on a web page associated with a given merchant system controller, the system registers the associated address of that given merchant system controller in the activity report.

In an embodiment, the address associated with the one or more merchant system controllers is selected from the group consisting of an IP address, a MAC address, an IMEI address and any combination thereof.

In an embodiment, the activity report comprises information selected from the group consisting of: item purchase, amount paid, the web page of the item purchase, identity of merchant paid for the item purchase, time and day of purchase, expected delivery, payment method used for the item purchase and any combination thereof.

In accordance with an aspect of the disclosure, the is provided a computer implemented system comprising the combination of the systems herein.

The system controller provides for the mobile device to access the mobile application without downloading this application into it memory via the input/output interface based on its proximity to a commercial location associated with the merchant controller system hosting this mobile application.

The system allows user to access mobile applications when they are near commercial locations associated with these mobile applications. This access is remotely provided without downloading the mobile application in the memory of the mobile device. This is provided by a controller in communication with the mobile device via an input/output interface integrated in the memory thereof and in communication with merchant system controllers associated with these mobile applications and these commercial locations.

The foregoing communications architecture provides a system that allows users to open mobile application whether remotely accessed via their mobile device or accessed by downloading the mobile application on their mobile device without entering user profile information. This is provided by having user profile information directly stored on the system controller that automatically registers the profile information in the profile request sections of the mobile applications based on predetermined conditions.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an aspect of the present disclosure, there is provided a computer implemented system for providing participating clients to communicate and/or transact with multiple participating merchants by way of mobile applications via a mobile device. The system comprises at least one client input/output interface integrated within at least one mobile device and a system controller configured for operative communication with the mobile device via a network so as to control the input/output interface. The system controller is configured for operative communication with at least one merchant controller system of at least one participating merchant via a network therefor. The merchant system controller hosts a mobile application for being downloaded within a mobile device providing for clients to communicate and or transact with the at least one participating merchant.

The system controller has an associated memory with processor executable code stored thereon and execution of the processor executable code causes the system controller to perform real time computer implementable steps. The system controller determines a geographic location of the at least one mobile device via a location application in the memory of the mobile device and accessible thereto via the input/output interface. The system controller determines whether the at least one mobile device is within a predetermined proximity level of a commercial location associated with the at least one merchant system. The commercial location is stored within the memory of the system controller or accessible thereto via the at least one merchant controller system. The system controller accesses the mobile application hosted by the at least one merchant controller system when the at least one mobile device is within the predetermined proximity level. The system controller displays the mobile application via the input/output interface. The system controller provides for the user to enter inputs and receive outputs via the mobile application without downloading the mobile application within the mobile device memory.

With reference to the drawings non-limiting illustrative embodiments will now be described so as to exemplify the disclosure and not limit the scope thereof.

Figure 1:
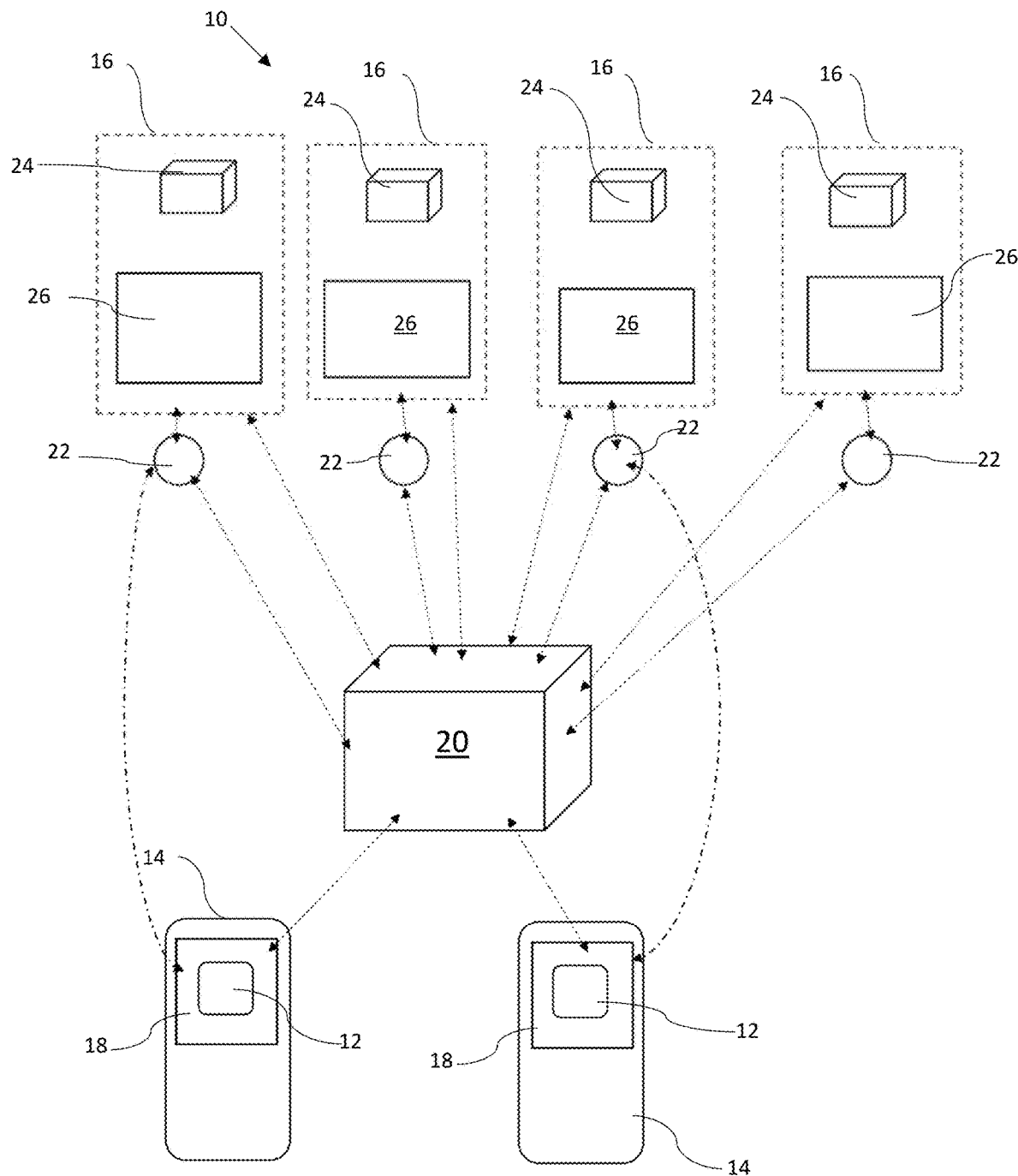
FIG. 1 shows is schematic representation of the architecture of the system for a location modulated client interface for mobile devices allowing remote access to merchant hosted mobile applications and for automatic profile registration thereon.

FIG. 1 shows the computer architecture of system 10 in accordance with a non-restrictive illustrative embodiment of the present disclosure. System 10 provides for controlling a client input/output interface 12 integrated into a mobile device 14 to allow system user clients to communicate and/or transact with a variety of system user merchants control systems 16 operating merchant-controlled input/out interface applications (i.e. mobile apps). The merchant control systems 16 provide mobile apps to users so that these apps could be downloaded in the memory 18 of the devices 14, and the users could communicate and transact with the merchants as is known in the art.

The present system 10 also provides for clients to access these mobile apps without downloading them via an input/output interface 12 integrated within the mobile device controller 18 (i.e. memory) of a client's mobile device 14.

The system 10 comprises a system controller 20 which acts as a bridge between the merchant control systems 16 and the mobile devices 14. The system controller 20 is in communication with the input/output interface 12 and with the merchant control systems 16 via a network communication. The controller 20 comprises a processor with an associated memory of processor executable code that when executed provides the system controller 20 with performing computer-implemented steps as described herein.

The system controller 20 comprises a databank of participating system users including clients and merchants. The participating system user clients are identified via the input/output interface 12 integrated within the memory 18 of their mobile device 12. The system controller 20 identifies merchants via a network connection with the merchant controller systems 16 which communicate via a variety of suitable interfaces therefor.

The controller 20 accesses the mobile application of the merchant control systems 14. The input/output interface 12 acts as a window which allows a user to view the mobile application without having to download it within the memory 18 of the mobile device 14. In an embodiment, the mobile application is downloaded within the controller 20, a given mobile application is associated with a given user via a given input/output interface 12 integrated within a given mobile device 14. In an embodiment, the controller 20 communicates with the merchant controller system 16 to access the mobile application that is run on the merchant controller system 16.

The system controller 20 provides for remotely displaying on the mobile device 14 via the input/output interface 12 a mobile application communicated by the merchant controller system 16 and for allowing the user to enter inputs and receive outputs from the mobile application without having it stored in the memory 18 of the device 14. The foregoing relationship is allowed when the mobile device 12 is in a given location that is within a given proximity level of a physical establishment operated by the merchant entity in control of the merchant controller system 16. Accordingly, the system 10 provides for location modulation of the output/input interface 12.

In an embodiment, the mobile memory 18 accesses a location application or has a location application integrated thereon. The location application may include a GPS app, a map locator app, and the like as is known in the art. In this non-limiting example, the location application provides for determining the location of the mobile device 14.

In an embodiment, the input/output interface 12 is in communication with the location application to receive location data therefrom and to communicate this location data to the system controller 20. Accordingly, the location of the mobile device 14 is communicated to the system controller 20. The system controller 20 ascertains the proximity of the mobile device 12 to an establishment (store, outlet etc.) associated with the participating merchant controller systems 16. This proximity is ascertained via a location application integrated within the associated memory of the controller 20 identifying the merchant establishments associated with the participating merchant controller systems 14 that are in within a predetermined proximity level (i.e. a given predetermined distance) from the mobile device 14.

In an embodiment, the system controller 20 determines whether or not the mobile device 12 is within a predetermined proximity level to one or more merchant establishments via a location application integrated within its associated memory that communicates with a location application within the memory 18 of the mobile device 14 via the input/output interface 12.

In an embodiment, the merchant controller systems 16 determines the location of one or more mobile devices 14 by communicating with the location application of the mobile devices 14 via the input/output interfaces 12.

In an embodiment, when a mobile device 14 is within a predetermined proximity level to a physical establishment associated with the merchant controller systems 16 and the foregoing is ascertained by the system controller 20, the system controller 20 executes the computer implementable step of accessing the mobile application of the merchant controller system 16. The mobile application is thus downloaded in the memory of the system controller 20 to be run thereon and to be remotely displayed to the user via the output/input interface 16. The system controller 20 provides for the user to enter inputs and receive outputs from the mobile application running on the controller 20. In this way, the controller 20 acts as a virtual machine (VM) providing a substitute for the real machine (i.e. the mobile device 12). The controller 20 provides the functionality needed to execute the mobile application and storing information relative thereto thereon. The controller 20 provides the foregoing for a plurality of mobile devices 14 with the integrated input/output interfaces 12 and a plurality of merchant controller systems 16. In this way, the user accesses a mobile application identified with the user via a remote connection thereby avoiding from downloading the actual mobile application within the memory 18 of the mobile device 14.

Figure 2:
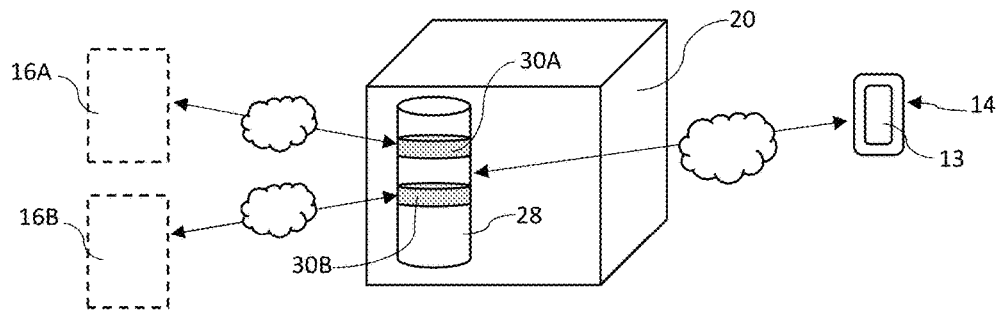
FIG. 2 is another schematic representation of the architecture of the system of FIG. 1 showing the client profile in the system controller and the remote access to the merchant hosted mobile applications via the client profile.

The foregoing scenario is illustrated in FIG. 2.

FIG. 2 shows the controller 20 having a user profile 28 stored in its memory bank that is associated with a client and is accessible thereto via the client's mobile device 14. The user profile 28 is also associated with applications 30A and 30B which have been downloaded and stored in the memory of the controller 20. Applications 30A and 30B are respectfully associated with merchant controller systems 16A and 16B. Accordingly, the user (i.e., client) uses their mobile device 14 to remotely control applications 30A and 30B which are stored on the controller 20 and not on their device 14 thereby transacting with merchant controller systems 16A and 16B via controller 20 which acts a virtual machine (VM) by command inputs via their real machine, namely device 14. Indeed, the VM 20 provides a mirror image of the application interface (including icons, image input commands etc.) on the display 13 (which forms part of the input/output interface) of the mobile device 14. The user thus views a "ghost" app rather than the actual app interface on their display 13. In this way, the user has the same impression of navigating an app that is on their device 14 but rather this app (30A, 30B) is on the VM 20 and they are remotely navigating on the VM 20. The VM 20 has a plurality of user profiles 28 each associated with respective users/clients and each being associated to one or more merchant provided applications such as 30A and 30B. As such, when the user enters a command on the mirror image website of the application 30A in actuality the command Is being entered on the VM 20. In fact, it is the VM 20 that has a direct line of communication with the merchant controller systems 16A and 16B and the user provides the VM 20 with instructions in real time regarding modulating/navigating the apps 30A and 30B which, these commands are effectuated by the VM 20.

Indeed, the user views a mirror page on their display 13 that is being transmitted to them by the VM 20. The VM 20 receives user requests via the mobile device 14.

Of course, 30A and 30B can also be merchant websites, web links, web apps, PWAs (progressive web apps) OTT (over-the-top) transmissions, and other programs provided by the merchants for interfacing with clients.

In an embodiment, when a mobile device 14 is within a predetermined proximity level to a physical establishment associated with the merchant controller systems 16 and the foregoing is ascertained by the system controller 20 and consequently, the system controller 20 executes the computer implementable step of accessing the mobile application of the merchant controller system 16. Via a network interface between the controller 20 and the merchant control system 16, the mobile application is run on the merchant controller system 16 and is remotely displayed to the user via the input/output user interface 12 by way of the controller 20. The system controller 20 provides for the user to enter inputs and receive outputs from the mobile application running on the merchant controller system 16 by communicating these inputs and outputs to the merchant controller system 16 via the network interface therebetween. In this way, the user accesses a mobile application identified with the user via a remote connection thereby avoiding downloading the actual mobile application within the memory 18 of the mobile device 20.

The input/output interface 12 provides a client to communicate and/or transact with the merchant via the mobile application.

In an embodiment, the merchant control system 16 is in operative communication with a position locator module 22. The position locator module 22 comprises a device, devices, assemblies, systems and combinations thereof selected from the group consisting of sensors, image capturers (e.g. cameras) and the like for communicating with a target in order to determine the location of the target's position, the target being the mobile device 14 which is physically associated with the user in possession thereof.

When the mobile device 14 has been ascertained as being with the predetermined proximity level for the controller 20 to provide access to the mobile application as described above, the module 22 can provide additional position locating data to the system to allow the system controller The module 22 is in operative communication with the merchant control system 16 and with the mobile device 14. The module 22 is in operative communication with the mobile device 14 via the input/output interface 12 which accesses a location application in the memory 18 of the device 14 or which provides location data from the controller 20. The module 22 may also be in operative communication with the controller 20 directly in order to receive data therefrom regarding the location of the mobile device 14. Indeed, the foregoing information can be provided from the controller 20 via the merchant control system 16.

The module 22 thus identifies an initial "presence" of the mobile device within the predetermined proximity level which corresponds to a physical area. Once within the corresponding physical area, the module 22 can follow the position of the mobile device 14 determining whether it is in the parking section of the establishment or moving within the store outlet premises of the establishment and communicating this information to the merchant controller system 16.

The merchant controller system 16 comprises a remote merchant master controller 24 and one or more local slave controllers 26 which may be physically located in the merchant commercial locations (i.e. physical establishments). The merchant controller system 16 has as associated memory with processor executable code stored thereon that when executed provides the merchant controller system 16 to perform computer-implemented steps as provided herein.

Having now described the computer architecture of system 10, the system 10 will be further described by way of non-limiting examples of implementation.

Figure 3:
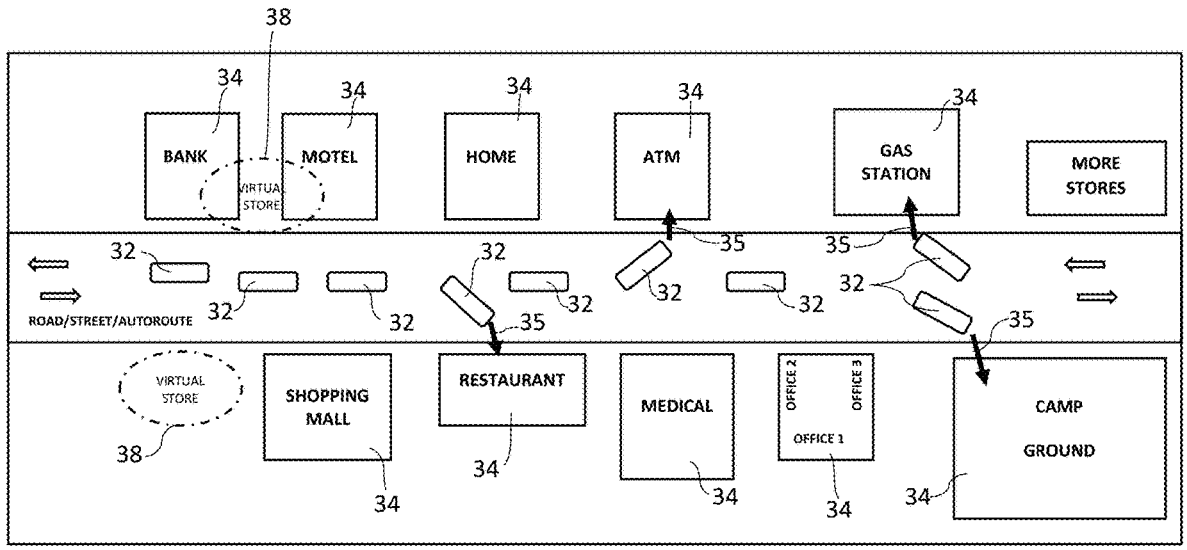
FIG. 3 is a schematic representation of the system of FIG. 1 in operation.

Turning to FIG. 3, the implementation of the system 10 is exemplified by various scenarios.

Participating users (i.e. clients) carrying their mobile devices 14 are positioned within respective vehicles 32. Once they are within the predetermined physical proximity of a physical location 34 associated with a merchant controller system 16, the mobile application of this merchant controller system 16 will be communicated to the user via their mobile device 14 by way of the input/output interface 12. For example, the user will be asked if they wish to open this particular mobile application or not and thus the user can enter the desired input from their mobile device 14 by way of the input/output interface 12. Once the user chooses to open the mobile application communicated, the input/output interface 12 acts as a window to this mobile application as it is not downloaded or run by the memory 18 of the device 12. The mobile application either remains within the merchant controller system 16 or is downloaded within the memory of the system controller 20. Accordingly, as user vehicles 32 pass by various commercial locations 34 of participating merchants such as Banks, Motels, ATMs, Gas Stations, Offices, Shopping Malls, Restaurants, Medical Stores, Camping Grounds and other stores and the like, the various mobile apps of these merchants will "open" via the input/out interfaces 16 integrated within the mobile devices 14 of the users and can be remotely accessed by the users to enter client inputs and receive merchant outputs.

The mobile application remote accessing step (i.e. the "opening of the app" step) may be automatic or upon request. This step is initialized when the mobile device 12 is within the predetermined proximity level described herein and schematically represented by arrow 35 in FIG. 3.

Once within the predetermined proximity level, the position location module 22 can further determine the position of the user. For example, the system 10 initially detects that the user is in the vicinity (predetermined proximity level) of a participating Restaurant location 34. Thus, the restaurant application will open or request to be opened on the user's mobile device 12. This is displayed via the display screen 13. The window to this remote application is of course the input/output interface 12 as the mobile application is remote (cloud, VM, etc.) as provided by the architecture of the main controller 20 which operatively communicates with the merchant control system 16 via the network interface therefor. The user chooses "open" and the restaurant menu opens for example. The user then parks their vehicle 32 within the commercial locations parking area (that is within the predetermined proximity level), the module 22 can via camera, sensor or other locator determine the exact position of the vehicle 32. This allows the merchant's staff to be sent to the exact location to deliver purchased products.

Indeed, this is advantageous during times of social distancing requirements allowing shoppers to enjoy distance shopping within the comfort of their vehicles as they purchase products at a merchant commercial location 34 via a remote mobile application as provided by the system architecture 10. This is also convenient for shoppers with animals or small children or individuals with mobility challenges, rather than leaving them behind, users can wait in the vehicle with them spending leisure time as they wait for delivery of purchased goods to their vehicles.

In an example of the scenario above, the user may leave their vehicle 32 and walk into the building of the commercial location 34 (i.e. into the restaurant, store etc.). In an embodiment, the user carries their mobile device 14 with them and the module 22 tracks their movement.

In another embodiment, the user has uploaded a participant profile 28 within a databank of the controller 20 including their picture. In this scenario, the module 22 comprises an image capturing device such as a camera that captures images of shoppers (including participating users) entering the store of the commercial location 34. In an embodiment, the captured images are compared with the images in the databank and when a match is made, the merchant controller 16 has identified that the user is no longer in their vehicle 32 but has entered the store and thus the merchant may accommodate this user with an appropriate protocol. For example, instead of at-vehicle delivery, the user's purchase order may be handed to them at a given store station.

The image comparison step described above can be performed by the system controller 20 receiving images directly from module 22 or via the merchant controller system 16 and comparing those images to the profiles within its databank to identify a match. In another embodiment, the controller 20 provides images from target profiles 28 within its databank to the merchant. Target profiles 28 herein are profiles from users that have opened and accessed the mobile application as provided herein and thus are in the predetermined proximity level and are interacting with the mobile application of the concerned merchant controller system 16.

In an embodiment, merchants may entice users travelling by one of the commercial locations 34 as described above via a promotional offer if the user purchases a product or a service therefrom.

Indeed, various commercial and incentive relationships can be contemplated within the computer architecture of system 10.

The system 10 provides for a user to save their profile information 28 within the memory of the system controller 20. The system controller 20 performs the computer-implementable step, when receiving a user input via the input/output interface 12 of automatically registering the user profile within the profile request section of the mobile application. In this way, a user need not enter their name, language, residence, or other pertinent information including payment information, address, photo, email, social medial profiles and the like, the controller 20 performs the step of automatically responding to the profile request of the mobile application and in this way, the mobile application will automatically open.

In an embodiment, the system controller 20 performs the computer-implemented step of requesting from the user, when in the predetermined proximity level, whether or not they wish to open a mobile application. Indeed, this mobile application may be remotely accessed as provided herein or downloaded within the memory 18 of the mobile device 12. This provides for automatic opening of mobile apps, effectively skipping the profile registration step.

In an embodiment, the system controller 20 provides for automatically registering the user profile to the mobile application without performing the step of requesting from the whether they wish for such registration or not. Indeed, the user can provide a user command to the system controller 20 for such automatic non-confirmed registration.

In an embodiment, this automatic non-confirmed registration is performed when certain conditions are met including a user command therefor and a predetermined proximity level with a commercial location 34 associated with the merchant controller system 16 as previously explained. In an embodiment, the predetermined proximity further requires a user location and/or position as determined by the module 22. For example, if a user is in a given parking lot of a given commercial location and has effectively parked, then this meets the foregoing conditions causing the controller 20 to access the mobile application and automatically register the user profile 28 thereon in order for the application to automatically open on the user's mobile device 14 via the input/output interface 12. In another embodiment, the controller 20 automatically registers the user's profile 28 when the module 22 has determined that the user has entered the commercial location 30 (store). Therefore, the controller 20 has user profile information 28 stored in its databank including photos, license plates and the like which permit the module 22 (camera, image capturing device) to provide visual data to the controller 20 directly or via the merchant controller system 16 compare the real-time captured visual data with the profile data in the databank to provide a match therebetween confirming the user identity and prompting the automatic registration step.

In an embodiment, the system controller 20 performs the automatic profile registration on a mobile application outside the predetermined proximity level if requested to do so by the user by way of user input commands (voice, keyboard etc.) via the input/output interface 12.

Figure 4:
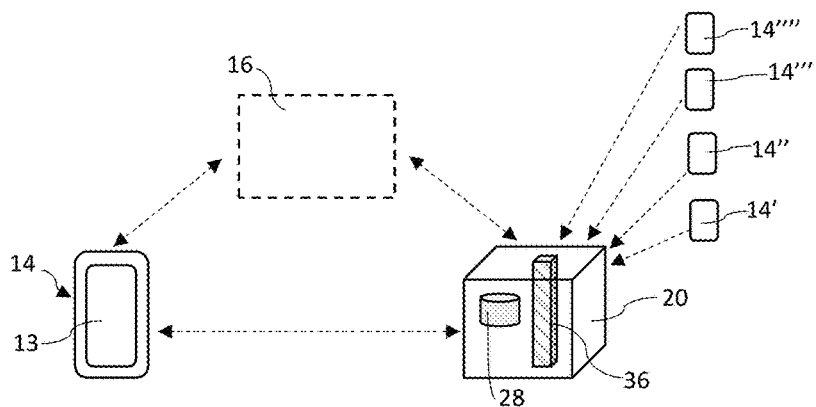
FIG. 4 is a further schematic representation of the architecture of the system of FIG. 1 showing the client profile in the system controller and the community databank for receiving feedback from other system client users.

FIG. 4 shows another representation of the operative communication between the controller 20, the merchant system 16 and the user mobile device 14. As shown and in accordance with the system 10, a mobile device 14 communicates with the controller 20 for the controller to determine if a condition as provided herein has been met (e.g. proximity, user input command etc.) for the device 14 to access a merchant provided application as provided by a merchant system 16. The controller 20 provides for downloading the merchant application in its memory (or databank) and for allowing the user to transact with the system 16 via the controller 20. In another embodiment, the application is not downloaded on the controller 20 but run on the merchant system 16 and the user controls the application via the controller 20 and their device 14. In another embodiment, the merchant application is downloaded on the device 14 and once the user has finished, the application is immediately removed from the memory 18. In this scenario, the controller 20 is in communication with the device 14 and saves the transaction or navigation operation in its memory so that the next time the user downloads this same application on their device 14, the controller 20 updates the downloaded application with the information from last use. The controller 20 in essence provides for saving the operation and information in the user's profile 28 which acts as user databank or activity history log, thus avoiding the need to take up space on the device memory 18. The controller 20 acts as a remote proxy memory for the device 16. Thus, the user can continuously have the application be removed from its device memory 18, as the system 20 tracks the memory 18 during application use and builds a mirror image memory thereof within the user profile/databank 28. In another embodiment, the user communicates directly with the merchant controller system 16 via their mobile device 14 and transacts therewith, the controller 20 communicates with the device memory 18 and/or with the merchant controller system 16 to build a mirror image memory in the user profile 28.

When the controller 20 requests from the user as to whether or not they want to access an app as explained herein, a message therefor is transmitted from the controller 20 to the mobile device 14. This message can be in the form of a graphical image (including a merchant logo) or textual message, a blinking graphical image (including a merchant logo) or blinking textual message, a sound including a ringtone, a vibration, and any combination thereof that can be accepted or refused by the user via a command therefor or simply by not "answering". Indeed, the transmitted message may emulate an incoming phone or video call. This provides a more user friendly and common way of accessing apps as users receive calls on a regular daily basis, rendering the opening step more intuitive. The controller 20 performs the computer implemented step of transmitting a request message to the device 14 which is communicated via the input/output interface 12 (including the display 13) to the user. The foregoing step is performed when the controller 20 has determined a condition as provided herein for the user to access a merchant provided application from a merchant controller system 16.

The device 14 allows the user to peruse potential apps via the controller 20 rather than communicating with the merchant controller systems 16. The controller 20 includes a community network databank 36, where users can rate or comment on various apps and merchants via their respective devices 14', 14", 14''', 14''''. As the user peruses potential available applications offered for download by merchant control systems 16, via the controller 20, the user can also access the community network databank 36 which includes relevant information for each available merchant app. Thus, when a merchant app icon appears on the user's display 13 with a link or additional icon to access the community network databank 36 relevant information including ratings, comments, and critiques as well as comparative information that may be useful for the user clients. The merchant controller systems 16 may also access the community network databank 36 to review ratings and comments so as to modify business practices. Indeed, the controller 20 can also track the performance of merchant provided apps such as monitoring how many times user clients view an app, the percentage of times the user clients open the apps, when they are either prompted to open the apps as provided herein or request to view the app as provided herein. This allows merchants to assess their market performance and adjust business practices accordingly.

Indeed, the condition for accessing a merchant provided application is not limited to proximity. The controller 20 can execute the computer implementable step of tracking user searches on their mobile device, when allowed by the user and upon input command therefor, in order to identify keywords or phrases stored in the memory of the controller 20 such as "what is a good restaurant", "bicycle repair" etc. and can then provide the user via their display a list of possible available merchant applications for perusal or can transmit a request message as previously explained. In another embodiment, the controller 20 provides a user interface on the display 13 whereby the user can search for available applications directly.

In fact, some merchants do not have physical outlets and are only available for transactions online. In an embodiment and with reference to FIG. 3, once a user requests for a given store or merchant that does not have a physical location, the controller 20 produces a virtual location 38 therefor on a virtual map such as a GPS map displayed via display 13 of the mobile device 14. Therefore, the system 20 communicates with memory 18 in order to modulate the virtual map application (such as a GPS app) stored in in memory 18. Thus, the user via the system 10 creates a virtual location 38 on the spot and meets the proximity condition as provided herein in real time and by request. This virtual location 38 can be indefinitely saved in the user profile 28 for that user and the controller 20 will treat the virtual store at its virtual location 38 as if it was a physical store as provided hereinabove. The virtual locations 38 may also be removed after use or at the request of the user via input commands via the input/output interface 12.

The user profile 28 on the controller 20 (VM) is modulated by the user client via the device 14 to provide a personalized, tailored made communication management of the merchant provided apps and transactions with the merchant controller systems 16. This saves memory 18 space in the device 14. If the user loses their device 14, their profile 28 is saved as is accessible via the security parameters provided to allow the user to retrieve their profiles 28.

Generally stated and in accordance with an embodiment of the disclosure, the system herein provides for modulating a navigation graphical user interface during movement of a vehicle. A navigation GUI includes a virtual map or video feed of the road or a satellite map and the like. An input/output interface is integrated within a mobile device being positioned within the moving vehicle and comprises a device controller with an associated memory of processor executable code stored thereon. The memory comprises a positioning system application (e.g. virtual map app, such as GPS and the like). This application provides for real-time tracking of a position of the moving vehicle within a geographic location, and determines a navigation pathway (direction pathway or direction path) towards a target location within the geographic location. The client input/output interface comprises a display for displaying the navigation graphical user interface. The system controller has an associated memory with processor executable code stored thereon. The system controller is configured for operative communication with the mobile device via a network. Execution of the processor executable code causes the system controller to perform real time computer implementable steps. The system controller determines the geographic location of mobile device in combination with moving vehicle its mounted to via the positioning system application in the memory of the mobile device and accessible thereto via the input/output interface. The system controller generates a leader virtual vehicle image within the navigation graphical user interface displayed via the device display. The virtual vehicle image is positioned ahead of the tracked position of the moving vehicle within the navigation pathway.

Figure 5:
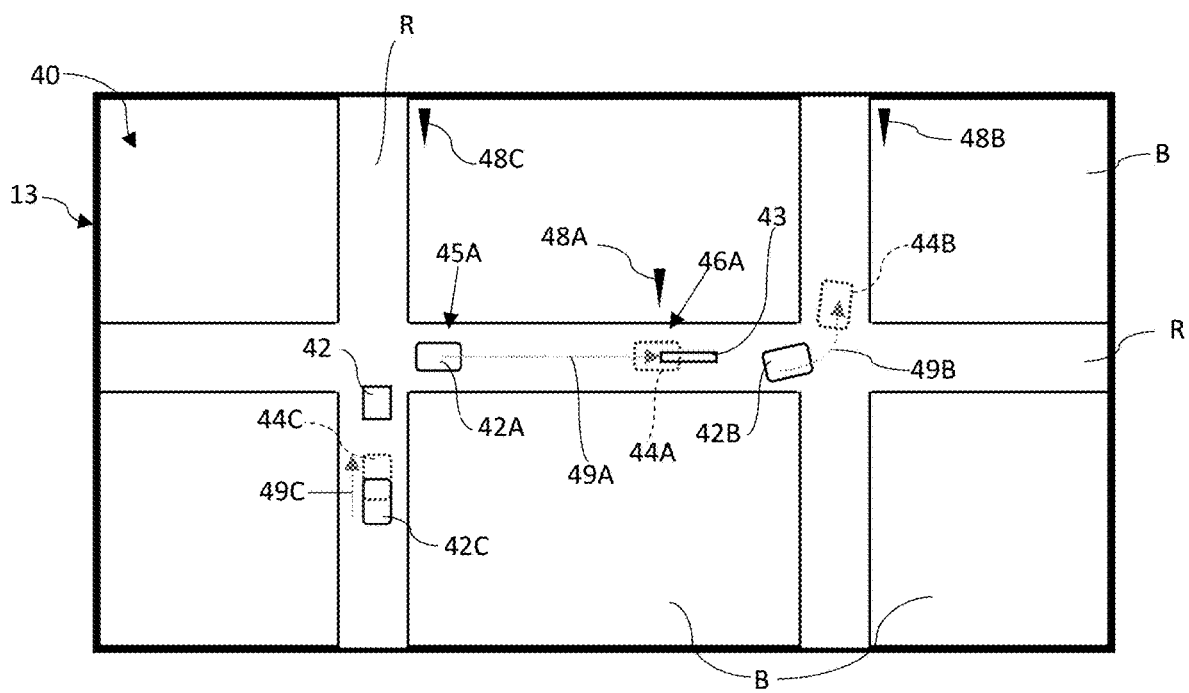
FIG. 5 is a schematic representation virtual map displayed by the display of the client device in communication with the system controller, the virtual map being modified by the system controller for navigation purposes.

Turning now to FIG. 5, there is shown a navigation GUI such as virtual map 40 such as a GPS map displayed via the display 13 of the device 14 by the related app stored in the memory 18 thereof. This virtual map app is modulated by the controller 20 as will be described herein. Indeed, a virtual map 40 displays a virtual image vehicle 42 of a given user on road R and blocks B therebetween. In this example, the virtual map 40 shows three separate users in three separate vehicles, 42A, 42B and 42C. For concision purposes only, FIG. 5 merges three separate maps 40 shown in three separated displays 13 of three separate devices 14 so as to allow for describing three different examples with the same figure. Each vehicle 42A, 42B and 42C is a virtual image representation of the real vehicle the user is in. The map 40 identifies a virtual target location 48 and the user can view their virtual vehicle 42A, 42B 42C and its position in the map 40 relative to a target location. In the examples of FIG. 5, each virtual vehicle 42A, 42B and 42C intends to reach a respective virtual target location 48A, 48B, 48C.

The controller 20 modulates the virtual map app in the memory 18 to create an additional virtual vehicle 44A, 44B, 44C on the map image 40. Each additional virtual vehicle 44A, 44B, 44C is related to a given one of the standard virtual vehicles 42A, 42B, 42C respectively. The standard virtual vehicles 42A, 42B, 42C are the ones created by the virtual map app as is known in the art. The additional virtual vehicles 44A, 44B, and 44C are created by the controller 20 and are leader or leading virtual vehicles in advance of their respective related standard virtual vehicle 42A, 42B and 42C. The leader vehicles 44A, 44B and 44C are in advance of each of their related standard vehicles 42A, 42B and 42C by either time interval or distance or a distance interval. In other words, the leader virtual vehicle is x seconds ahead of the standard virtual vehicle or x meters ahead of the standard virtual vehicle. The virtual map app creates a direction path for each standard vehicle 32A, 32B and 32C, sometimes real time directions are indicated as the user is driving by arrows or voice commands (i.e., "move straight ahead", "turn right", "turn left", "take exit" etc.). Whether or not the virtual map app will indicate direction in real time it has set out a path and follows the real vehicle being driven relative to that path indicating the real time position of the user on the virtual map 40 by way of the standard virtual vehicle image 42A, 42B and 42C. The controller 20 uses the directions path provided by the virtual map app and positions the leader virtual vehicle 44A, 44B and 44C ahead of its related standard virtual vehicle 42A, 42B and 42C by either a time interval or a distance interval. In other words, the controller 20 will show where vehicle 42A needs to be in 30 seconds or in 3 meters from its current position. Vehicle 42A is in position 45A and it needs to be in position 46A in a time interval or a future distance interval and as such the leader virtual vehicle 44A is shown in position 46A to indicate where the standard virtual vehicle 42A needs to be. The foregoing is done in real time and as such, each vehicle image 42A, 42B and 42C has a respective leader vehicle images 44A, 44B and 44C moving ahead of it in real time. This allows the user to follow or tailgate a vehicle in a virtual map 40 facilitating navigation for the virtual map user as the leader vehicle moves ahead of them, they follow, going straight behind it and turning behind it as shown by the arrows 49A, 49B and 49C.

Indeed, the user is shown how they will need to react (turn left, turn right etc.) in 4 seconds from now or in 4 meters from now for example in contrast to standard virtual maps when they need to react in real time. The present system provides for a reaction lag time.

In an embodiment, when the leader vehicle reaches a target location the leader vehicle turns into an image representing the merchant at the target location such as a logo and the like to capture the attention of the user quickly indicating to them that they are about to physically reach their target location.

In an embodiment, the standard vehicle images 42A, 42B and 42C and leader vehicle images 44A, 44B and 44C are visually distinguished by color, size, shape, and the like. In an embodiment, the leader vehicle images 44A, 44B and 45C are transparent in that if they overlap with other objects 43 in the map 40 via the display 13 such as its related vehicle (42C and 44C) or another vehicle (44A and 43) as shown in the examples of FIG. 5.

In an embodiment, the distance between the standard vehicle image and the leader vehicle image is determined by the speed of the real vehicle, for example, when the real vehicle is accelerating, the standard virtual vehicle image and the leader virtual vehicle image are further apart as the user needs to react quickly and see what is coming further ahead in the direction path (as shown in the example distance between vehicle images 42A and 44A), when the user drives slower, the distance decreases as the user has a greater reaction time (as shown in the example distance between vehicle images 42C and 44C). When the real vehicle stops, the standard virtual vehicle image stops as well, and the leader virtual vehicle image also stops ahead of the standard vehicle.

Indeed, in an embodiment, the controller may also produce visual arrows 49A, 49B and 40C between the standard vehicle images 42A, 42B and 42C and the leader vehicle images 44A, 44B and 44C to further assist the visual navigation of the user.

In an embodiment, the virtual map 40 is a terrain map (e.g., a satellite photo map). In an embodiment, the virtual map 40 is a three-dimensional virtual reality immersive map.

Figure 6:
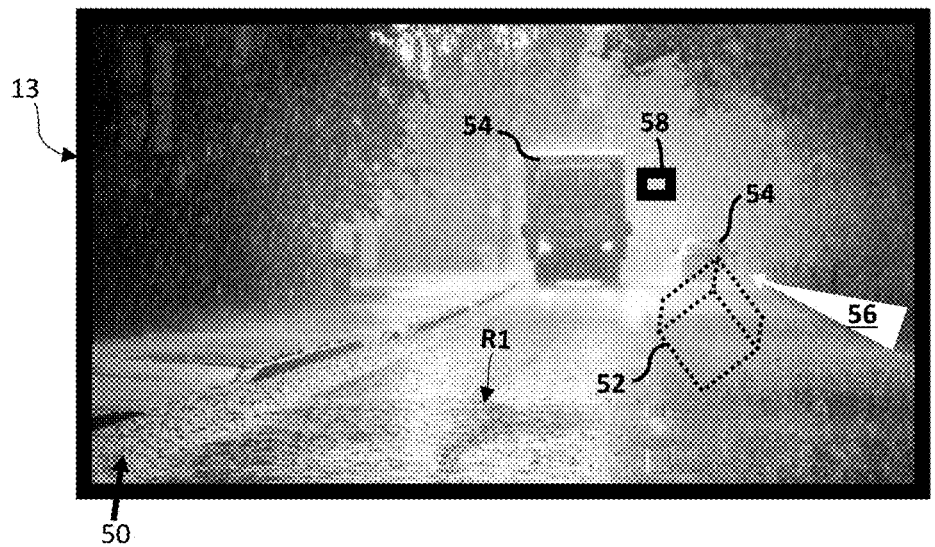
FIG. 6 shows a real time video feed displayed by the client device in communication with the system controller, wherein the images are captured in real time by the client device, the displayed video feed being modified by the system controller for navigation purposes.

Turning now to FIG. 6, in an embodiment, the device 14 is in operative communication with a camera. In an embodiment, the camera s integrated to the device 14 with a lens opposite its display 13 (as is known in the art) so as to take a real time video of the road R1, the device 14 of course is conveniently positioned with the camera lens facing the windshield to for video capture (acquisition) of the road (ambient environment in the direction pathway) providing the device 14 to display a real time video feed 50 of the road during driving, the controller 20 communicates with the GPS to receive information related to the direction path, the position of the real vehicle and uses that information to produce a virtual leader vehicle image 52 directly in the displayed video feed 50 via display 13. Thus, the driver follows a virtual vehicle 52 through their screen 13. In this embodiment, the leader vehicle image 52 is transparent, so it moves like a "ghost" overlapping real physical objects (such other cars 54) in the video display 13. As the leader vehicle image 52 does not exist in the real world, their vehicles are shown to drive right through it In an embodiment, the controller 20 includes a memory of "events" that have been previously registered. These events include heavy traffic, accidents, bad weather, and danger. When the camera captures images in real time, the controller 20 executes the computer implementable step of analyzing the real time video feed 50 and looks further down the road. The controller 20 knows the trajectory along the road R1, the trajectory represented here by arrow 56, as the direction path has already been determined by the virtual map app (e.g. GPS). In this way, the controller 20 selects a pixel portion, 58 of the video feed 50 that is further downstream than the virtual leader image 52 along the trajectory 56 (i.e. the direction path) in order to compare the image of this pixel portion 58 with registered events in the controller 20 memory. In other words, a traffic jam, an accident, a fire may only be visible by an enlargement of a pixel portion 58 in the video feed 50 that is further down the road R and that is not easily visible by the driver as they are too far away. If there is a match between the analyzed pixel portion 58 and an event, the controller 20 performs the computer executable step of communicating this match to the driver. In an embodiment, the controller 20 provides a warning image or text in the video feed 20 to communicate the match. In an embodiment, the controller 20 modifies the image of the leader virtual vehicle 52, such as changing its color, shape, configuration, size, and the like. In an embodiment, the controller 20 slows down the leader virtual vehicle 52 or brings it to a stop. All of the foregoing serves to warn the driver before they reach the event taking place and prompt early reaction as they are following a virtual vehicle 52 and reacting to that vehicle as one would do when they follow a real vehicle. The memory of controller 20 includes a series of images, video clips, all of which correspond to events and executes the computer implementable step of comparing images to the registered images and video clips in order to determine a match based on a predetermined similarity threshold. The driver via the input/output interface 12 may selectively override the controller 20 when communicating the match and as such, the controller 20 will cease to communicate as provided herein above allowing the driver to view the feed 50 without the visual warnings.

Generally stated and in accordance with an embodiment, of the disclosure, there is provided a computer implemented system for monitoring, recording, and reporting transactions of system users with merchants. A client device is associated with a user comprising an input/output interface including a display and provides for network communication with one or merchant controller systems associated with one or more merchants. The display of the client device providing for viewing merchant web pages generated by the one or more merchant controller systems and for selecting items thereon and selectively making payments therefor via input commands through the input/output interface. The system controller has an associated memory with processor executable code stored thereon. The system controller comprises a databank of user profile information stored thereon related to the user. The system controller is configured for operative communication with the client device via a network. Execution of the processor executable code causes the system controller to perform real time computer implementable steps of: monitoring user activity of the client device on the merchant web pages the user activity comprises web page viewing activity, item selection activity and payment activity; registering the user activity in the user profile; and generating a user activity report.

Figure 7:
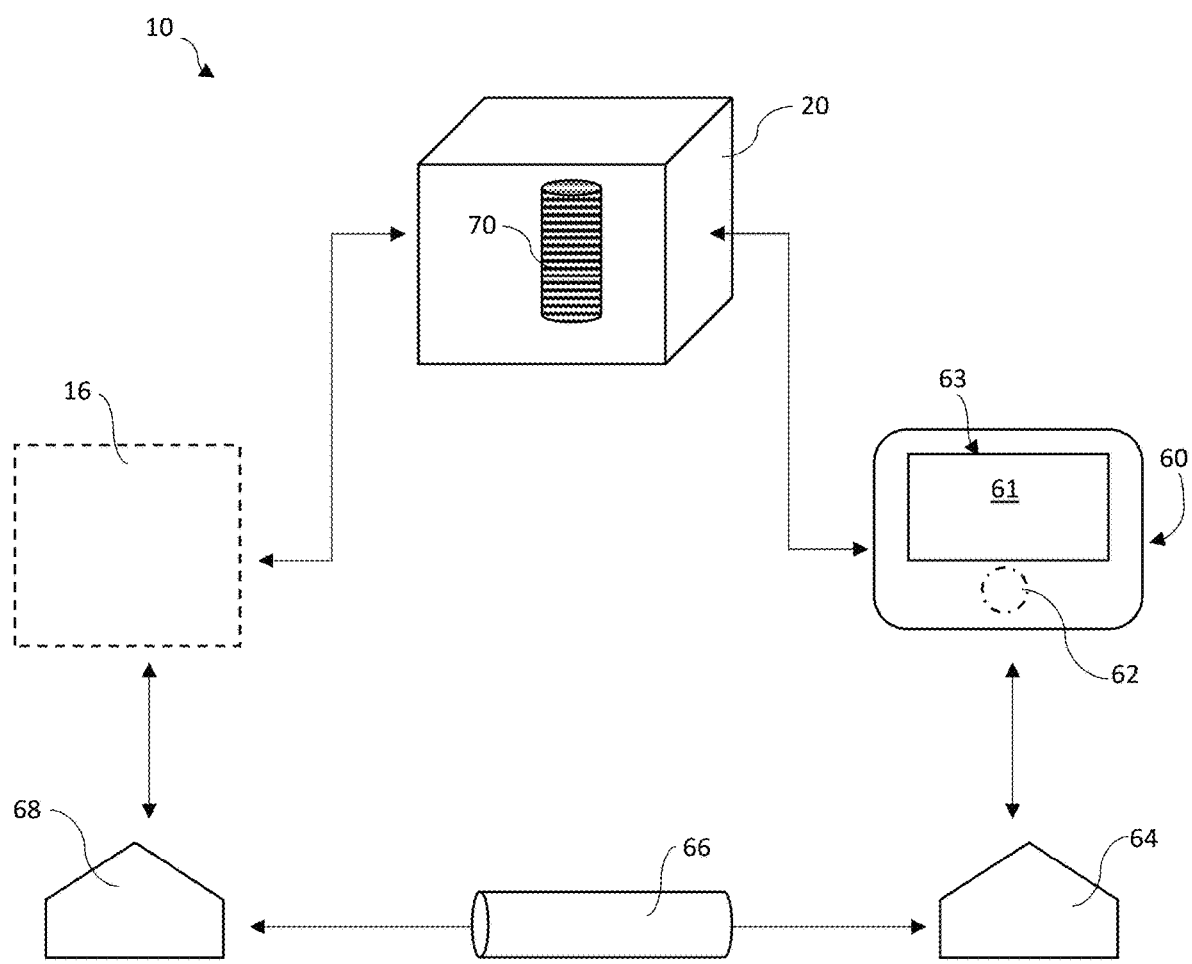
FIG. 7 is yet another schematic representation of the architecture of the system of FIG. 1 showing the financial transaction monitoring component of the system.

Turning now to FIG. 7, the financial transaction registration component of system 10 will now be described. System 10 includes the controller 20 in a network communication with the merchant controller system 16 and with a client device 60, the client device 60 may be a mobile device 14 or any other computer device associated with the client having a processor 62 (controller) with an memory of associated processor (controller) executable code for performing computer implemented steps when the code is executed. When a client purchases an article from the merchant via the merchant controller system 16, the client's device 60 communicates via a network with the client's financial institution 64. The client is paying via credit card or another payment method as is known in the art. The client's financial institution makes a payment via a payment gateway 66 to the merchant's financial institution 68 via a network communication, the merchant controller system 16 can access the funds via their financial institution 68 as they are in a network communication therewith.

The controller 20 monitors the transactions between the client device 60 and the merchant controller system 16 and registers the transactional history and shopping history of the client. The client registers a profile 28 on the controller 20. This profile 28 allows the client user to use a plurality of device 60 and be identifiable to the controller 20 via a signing step. The controller 20 thus provides a user interface that is displayed via the device display 61 providing for signing step or providing for downloading a controller app in the controller memory 62 of device 60 thereby allowing the device 60 and the controller 20 to be in operative communication as provided herein.

Thus, the controller 20 when in operative communication with the controller memory 62 of the device 60 and as such monitors the navigational activity of the user via their device on the online platforms provided by the merchant controller system 16. Therefore, for every financial transaction, the controller 20 builds a log 70 in its memory associated with the user profile 28 of the particular user. This log 70 includes details selected from the group consisting of and without limitation thereto of, the date of the transaction, the time of the transaction, the http address of the merchant on which the client selected the article/service for purchase, the article/service that was purchased, the payment amount, the payment method that was used inclusive of credit card identification, the details related to delivery of the article/service, the time navigation time the client spent on the merchant's online platform before selecting the article/service and other details. The details to be monitored and logged can be modulated by the user via input commands by way of their input/output interface 63 which includes the display 61. The controller 20 can thus transmit a message report to the user of their transaction and shopping history in real time or in the form of regular reports at predetermined time intervals.

The foregoing is convenient as the user client can get a single report of their transactions no matter which payment method or card that they used giving them a full picture of their spending and shopping history over a week, month a year etc. This report is useful for security reasons as it provides a more content filled and contextualized receipt of a transaction.

The controller 20 can also monitor and log the IP, MAC and IMEI addresses of the device 60 and the merchant controller system 16 and associate the foregoing with the transaction as an additional identifier providing even further security to the purchaser (client user).

In another embodiment, the transaction monitoring component of the system 10 provides for monitoring transactions when the client user is not purchasing via their device 60 and purchases physically by way of credit card at a merchant's physical establishment. The controller 20 provides an application for being downloaded by the merchant controller system 16 in order to provided operative communication between the controller 20 and the merchant controller system 16. The user has a profile 28 registered in the memory (databank) of the controller 20, the user profile 28 includes credit card information. When the user transacts via the POS of the merchant, the merchant controller system 16 communicates the card to verify it against the profiles 28 in the controller 20 databank. The controller 20 verifies if the card being processed corresponds to a card of one of the profiles 28 and if so the controller 20 provides for requesting the transaction details from the merchant controller system 16 on the basis of match and the foregoing is automatically transmitted to the controller 20 which adds the transaction log to its report for that given client (i.e. the holder of the card in question). The transaction log can include without limitation, the transaction time, the transaction location, and other relevant transaction information as can be modulated by the system merchant users via the controller user platform interface.

Accordingly, the controller 20 transmits transaction reports as they occur in real time or in aggregates at regular intervals as desired by the client as per their personalized modulation of the reporting.

The controller 20 can provide the user with a user platform interface that includes all reports and transaction history as provided herein, merchant app usage, on road shopping navigation providing users with a full analysis of their consumer activity whether transacting, perusing or physically visiting locations or driving by locations. The user profile 28 may include other contact information such as email, phone number, MAC, IP and/or IMEI addresses providing the controller 20 to communicate with the client and report on the client activity, providing reports for verifying the veracity of financial transactions via network addresses, credit card numbers and physical locations giving the user multiple hard evidence when they wish to challenge a fraudulent financial statement regarding a false transaction.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A computer implemented system for providing participating clients to communicate and/or transact with multiple participating merchants by way of mobile applications, the system comprising:

at least one input/output interface including a display screen integrated within at least one mobile device associated with a client and having an associated mobile device memory; and a system controller having an associated system controller memory with processor executable code stored thereon, the system controller configured for operative communication with the mobile device, the system controller being configured for operative communication one or more merchant system controllers of one or more participating merchants, the merchant system controllers hosting respective one or more mobile applications for being downloaded within the at least one mobile device, each of the one or more mobile applications comprise a respective application interface comprising icons and image input commands for being displayed via the display screen providing for clients to communicate and or transact with the at least one participating merchant, wherein execution of the processor executable code causes the system controller to perform real time computer implementable steps of:

receiving user input commands from a given participating client via the input/output interface for creating a user profile stored in the system controller memory, the user profile being associated with the given participating client and including mobile device information of the given participating client;

creating a virtual machine stored in the system controller memory and associated with the given client based on the user profile;

providing the client to download on the virtual machine associated therewith a selected one or more mobile applications hosted on the merchant system controllers by way of the user input commands via the input/output interface;

executing the selected one or more mobile applications downloaded on the virtual machine;

creating ghost application interfaces including respective ghost icons and ghost image input commands associated with the selected one or more mobile applications, wherein the ghost icons and ghost image input commands are mirror images of icons and image input commands of the selected mobile applications;

displaying the ghost icons via the display screen of the at least one mobile device and providing for displaying the ghost image input commands via the display screen when the client inputs a command therefor via the ghost icon, the ghost image commands providing the client to enter inputs and receive outputs displayed via the display screen from the mobile applications downloaded on the system controller without downloading the mobile applications in the mobile device memory;

wherein the system displays a given one of the ghost icons of a given one of the selected mobile applications via the display screen when the mobile device is within a predetermined proximity level of a commercial location associated with the merchant controller system comprising the given one of the selected mobile applications and wherein when the mobile device is outside the predetermined proximity level, the system does not display the given ghost icon via the display screen.

2. A computer implemented system according to claim 1, wherein the mobile applications comprise respective profile registration sections requiring inputs from client prior to being downloaded or prior to being accessed after being downloaded, wherein execution of the processor executable code causes the system controller to perform real time computer implementable steps of:

accessing the selected one or more mobile applications hosted by the at least one merchant controller system;

automatically entering the stored user profile information in the profile registration section of the mobile application related to the given participating client providing for downloading the selected one or more mobile applications on the system controller or providing for the one or more mobile applications already downloaded on the system controller to become accessible.

3. A computer implemented system according to claim 1, wherein execution of the processor executable code causes the system controller to perform real time computer implementable step of determining a geographic location of the at least one mobile device via a location application in the memory of the mobile device and accessible thereto via the input/output interface, wherein the commercial location is stored within the memory of the system controller or accessible thereto via the merchant controller system comprising the given one of the selected mobile applications.

4. A computer-implemented system according to claim 1, further comprising a position locator module in operative communication with the system controller for providing profile data thereto, wherein execution of the processor executable code causes the system controller to perform real time computer implementable steps of:

(a) comparing the profile data received form the position locator module to the user profile information stored in the system controller memory; and (b) determining a match between received profile data and stored user profile information, wherein displaying a given one of the ghost icons of a given one of the selected mobile applications via the display screen is performed based on steps (a) and (b) being performed.

5. A computer-implemented system according to claim 1, wherein downloading of the a selected one or more mobile applications on the virtual machine is dependent on the mobile device information included in the user profile information.

6. A system according to claim 5, wherein the commercial location is selected from the group consisting of a physical location and a virtual location.

7. A computer-implemented system according to claim 1, wherein the system further comprises a position locator module for capturing information related to a target within the predetermined proximity level, wherein the target is selected from the group comprising the mobile device and a combination of the mobile device and the participating client associated therewith, wherein the predetermined proximity level comprises a predetermined physical area.

8. A computer-implemented system according to claim 7, wherein the position locator module comprises one or more devices selected from the group consisting of image capturing devices, sensors, GPS devices and combinations thereof.

9. A computer implemented system according to claim 7, wherein the merchant controller system is in operative communication with the position locator module for receiving the captured information of the target within the predetermined physical area, the merchant controller communicating the received captured information of the target to the system controller.

10. A computer-implemented system according to claim 7, wherein the system controller is in operative communication with the position locator module for receiving the captured information of the target within the predetermined physical area.

11. A computer-implemented system according to claim 10, wherein execution of the processor executable code causes the system controller to perform real time computer implementable step of determining whether the captured information matches the user profile thereby determining the presence of the user in the predetermined physical area and communicating the determined presence to the merchant controller system.

12. A computer-implemented system according to claim 7, wherein execution of the processor executable code causes the system controller to perform real time computer implementable step of transmitting a message to the user via the input/output interface prior to displaying the ghost icon, the message requesting from the user to input a command accepting that the ghost icon be displayed via the display screen.

13. A computer-implemented system according to claim 12, wherein the message is selected from the group consisting of a textual message, a graphical message, an audio message, a vibratory message and any combination thereof.

14. A computer-implemented system according to claim 12, wherein the user profile stored in the memory of the system controller comprises user identification information, wherein execution of the processor executable code causes the system controller to perform real time computer implementable step of receiving information from the user via input commands in order to store the user identification in the memory thereof, the system uploading the user identification information to the mobile application when the user inputs the command accepting that the ghost icon be displayed via the display screen.

* * * * *